(12) United States Patent  (10) Patent No.: US 8,329,045 B2
Baumann et al.  (45) Date of Patent: *Dec. 11, 2012

(54) STATIONARY CLOTH MEDIA FILTRATION

(75) Inventors: Peter G. Baumann, Roscoe, IL (US);
Lloyd W. Johnson, Roscoe, IL (US);
David Smith, Beloit, WI (US); **Eugen
O. Bergmann**, St. George, UT (US)

(73) Assignee: Aqua-Aerobic Systems, Inc., Loves Park, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/455,748

(22) Filed: Jun. 5, 2003

(65) Prior Publication Data
US 2004/0245190 A1   Dec. 9, 2004

(51) Int. Cl.
*B01D 29/68* (2006.01)
(52) U.S. Cl. .......................... 210/767; 210/791; 210/806
(58) Field of Classification Search .................. 210/791, 210/767, 806
See application file for complete search history.

(56) References Cited

U.S. PATENT DOCUMENTS

| | | | | |
|---|---|---|---|---|
| 401,930 A * | 4/1889 | Cooper et al. | ............. | 210/323.2 |
| 1,359,162 A * | 11/1920 | Genter | ............. | 210/142 |
| 2,351,332 A * | 6/1944 | Goodloe | ............. | 210/461 |
| 2,996,189 A * | 8/1961 | Salterbach | ............. | 210/155 |
| 3,189,181 A * | 6/1965 | Couse | ............. | 210/291 |
| 3,731,814 A | 5/1973 | Walters | | |
| 4,090,965 A | 5/1978 | Fuchs | | |
| 4,107,026 A | 8/1978 | Freeman | | |
| 4,428,838 A | 1/1984 | Creps et al. | | |
| 4,519,903 A * | 5/1985 | Johnson | ............. | 210/94 |
| 4,639,315 A | 1/1987 | Fuchs | | |
| 5,374,360 A | 12/1994 | Weis | | |
| 5,707,527 A * | 1/1998 | Knutson et al. | ............. | 210/660 |
| 5,876,612 A | 3/1999 | Astrom | | |
| 6,090,298 A | 7/2000 | Weis | | |
| 7,001,507 B2 * | 2/2006 | Orozco et al. | ............. | 210/164 |
| 2004/0124158 A1 * | 7/2004 | Smith et al. | ............. | 210/791 |

FOREIGN PATENT DOCUMENTS

| | | | |
|---|---|---|---|
| EP | 498037 A1 * | 8/1992 | |
| GB | 494565 | 10/1938 | |
| JP | 55-44359 | 3/1980 | |
| JP | 55044359 A * | 3/1980 | |
| WO | WO 9008587 A * | 8/1990 | |

OTHER PUBLICATIONS

English Translation of WO 90/08587; (Aug. 1990).*

* cited by examiner

*Primary Examiner* — Terry Cecil
(74) *Attorney, Agent, or Firm* — Niro, Haller & Niro

(57) ABSTRACT

A method for filtering water or wastewater including the steps of filtering by gravity through a stationary cloth filter media supported in a treatment basin by a structure forming an effluent plenum, and cleaning the media by backwashing.

22 Claims, 8 Drawing Sheets

STATIONARY CLOTH MEDIA FILTRATION

FIELD OF THE INVENTIONS

The present inventions relate generally to water and wastewater treatment processes and devices. More particularly, the present inventions relate to stationary cloth media filtration having a cloth media support structure which forms the effluent plenum for the discharge of filtered influent.

BACKGROUND OF THE INVENTIONS

There are a variety of cloth media filtration systems available for water and wastewater treatment. However, these systems have rotating frame assemblies supporting the cloth filter media and/or require separate effluent channels for effluent discharge.

For example, available disk filtration systems generally have a tank with an inlet and outlet and a rotatable filter frame assembly positioned between the inlet and outlet. Cloth filter media is stretched over disk type frame sections which are connected to a rotatable support structure, such as a center tube pipe. During filtration, influent flows into the tank and passes through the rotating cloth filter media, through the hollow disk frame section and into the effluent center tube for discharge through the tank outlet. See, for example, U.S. Pat. No. 4,639,315. The cloth filter media is periodically cleaned by a variety of procedures, such as backwashing and/or high pressure spray while the disks are rotating. See, for example, U.S. Pat. Nos. 5,374,360, 5,876,612 and 6,090,298.

Similarly, another cloth media filtration system is generally referred to as drum filtration. In drum filtration systems, cloth filter media is stretched over support frames that form a large drum shape, as opposed to disks. The drums are attached to a center tube structure and together form a rotatable filter frame assembly. During filtration, influent flows into the tank and passes through the rotating cloth filter media, depositing the suspended solids on the cloth. The filtered influent flows through the rotating filter frame center tube and is discharged through the tank outlet. See, for example, U.S. Pat. No. 4,090,965. Like disk filtration, the cloth filter media is periodically cleaned while rotating by backwashing and the like.

A more recent development in cloth media filtration is stationary cloth media filtration systems invented by some of the same co-inventors as the present inventions and assigned to Aqua-Aerobic Systems, Inc. This development is shown and described in pending U.S. patent application Ser. No. 10/329,630, filed on Dec. 26, 2002, now U.S. Pat. No. 6,858,140, entitled "Process and Devices for Water and Wastewater Treatment Including Stationary Cloth Media Filtration. In general, this system includes one or more distinct sealed effluent plenums. A series of cloth filter media covered filter plates are attached to and in fluid communication with the effluent plenums. Influent flows into the filtration basin through influent plenums and passes through the hollow cloth filter media covered filter plates. The filtered influent is then discharged through the effluent plenums. The cloth filter media is periodically cleaned, typically by backwashing, using a traveling bridge type assembly and the like.

While the above described systems are effective for a variety of applications, there are some inherent limitations for other applications. For example, the rotating disk and drum cloth media filtration systems are limited in capacity because of the necessity for rotation of the assembly during both filtration and cleaning, which limits the length of the assemblies. To increase their length and capacity, it is believed that intermediate supports, larger pumps and more backwash equipment would be required. In addition, such systems necessarily have at least one rotating seal that is a potential area for failure and contamination by infiltration of untreated influent. These systems also require motors and related equipment necessary to impart rotation to the assemblies.

The stationary cloth filter media discussed in pending application Ser. No. 10/329,630 is also effective for certain types of applications. However, this system requires, among other things, separate effluent plenums and a series of cloth media filter plates attached to the effluent plenums. As such, a large number of seals (for example, between each filter plate where it is attached to the effluent plenums) are required, again, posing potential contamination problems.

SUMMARY OF THE INVENTION

The present inventions preserve the advantages of known water and wastewater treatment filtration systems and devices and provide new features, advantages and benefits over these systems. In addition, the present inventions preserve the advantages of known systems and devices that may be used in and/or are associated with these systems and provide new features, advantages and benefits.

In a preferred embodiment of the present invention, a cloth media filtration system is provided for the treatment of water and wastewater having a stationary cloth filter media support structure that also forms the effluent plenum for the discharge of filtered influent. Cloth filter media, preferably, but not limited to, a one piece sock, is attached to the hollow cloth media support structure to filter the effluent passing through it. A traversing backwash system may also be provided to enable the periodic cleaning of the cloth filter media. The cross-sectional shape of the stationary support structure is preferably a diamond or hexagon, but other cross-sectional shapes may also be employed, depending upon such things as system requirements and the like.

Also in a preferred embodiment of the present invention, a cloth media filtration device is provided having at least one stationary cloth media support structure having a length, a cross-sectional shape and two ends. One end of the support structure is sealed and the other end of the support structure is open to and in fluid communication with an outlet of a treatment basin. The support structure supports the cloth filter media and also forms the effluent plenum for the discharge of filtered effluent. The cross-sectional shape of the support structure may be a variety of shapes and the cloth filter media is preferably a one piece sock, but may also be attached in sections or otherwise as known in the art. A traversing backwash system to clean the cloth filter media and a control system to control the filtering and backwash operations may also be provided.

The present inventions also provide a cloth media filtration device for supporting cloth filter media having at least one elongated cloth media support structure for placement in a water or wastewater treatment basin that remains stationary during filtration and which forms the effluent plenum for the discharge of filtered influent. Traversing backwash and control systems may also be provided.

A preferred method for filtering an influent of water or wastewater in a treatment basin and discharging the filtered influent through an effluent plenum is also provided, which includes the steps of introducing influent for treatment into a treatment basin, filtering the influent through cloth filter media supported on a stationary cloth media support structure and discharging the filtered influent through an effluent plenum formed by the stationary cloth media support structure. The methods may also include traversing backwash systems and control systems.

The present inventions further provide a cloth filter media filtration system for the treatment of water or wastewater in a treatment basin having stationary cloth filter media support means to support cloth filter media and also for forming effluent means for the discharge of filtered influent from the treatment basin. Traversing backwash means for periodically cleaning the cloth filter media is also provided. The cloth filter media support means may have a variety of cross-sectional shapes, and control means may also be provided.

Accordingly, it is an object of the present invention to provide processes and devices for the treatment of water or wastewater using cloth filter media that is supported by a stationary cloth media support structure that also forms the effluent plenum for the discharge of filtered influent.

Another object of the present invention is to provide methods and devices for stationary cloth media filtration wherein the cloth media support structure forms the effluent plenum for the filtered influent and which may be retrofitted into existing treatment basins, designed for new installations or as a stand alone tank unit.

An additional object of the present invention is to provide cloth media filtration that reduces the number of seals and/or eliminates the need for moving or rotating seals to isolate the untreated influent from the treated effluent and prevent contamination of the effluent.

Still another object of the present inventions is to provide processes and devices for stationary cloth media water and wastewater treatment that eliminate the need for traditional granular media associated with standard sand or other granular media filtration systems.

Still yet another object of the present inventions is to eliminate the equipment required to impart rotation to rotating cloth filter media systems.

Still an additional object of the present inventions is to provide increased water or wastewater filtration capacity without increasing the treatment basin footprint.

Still yet an additional object of the present inventions is to provide increased flexibility in filtration capacity by changing the cross-sectional shape of the stationary cloth filter media support structure depending upon application or design requirements.

A further object of the present invention is to provide water and wastewater filtration methods and devices that include one or more of the above stated or apparent aspects, features and advantages, alone or in combination, and also as may be set forth or become apparent below.

Definition of the Terms

The following terms which may be used in the various claims of this patent are intended to have their broadest meaning consistent with the requirements of law:

Cloth filter media: Any permeable cloth-like material, including but not limited to natural or synthetic fiber or membrane compositions.

Treatment basin: The overall area devoted to the filtration process, including the area where filtration occurs, and which may also include associated chambers, conduits, channels and the like for the introduction of influent and ultimate discharge of treated effluent.

Cloth filter media support structure: The stationary assembly for placement within the treatment basin that supports the cloth filter media and which forms the effluent plenum through which filtered influent is discharged. The assembly may also be referred to as "support structure."

Traversing backwash system: The structural and mechanical assembly that carries the components necessary to conduct the backwash and other operations which is able to traverse the length of the cloth filter media support structure and associated cloth filter media. The system may include, but is not limited to, traveling bridge type assemblies and backwash shoes, submerged pulley activated assemblies and the like.

Control system: The structural, mechanical and electrical assembly that measures and controls water levels in the treatment basin, the influent and effluent levels, the operation of the filtration system, as well as the operation of the traversing backwash system and the like.

Effluent plenum: The effluent discharge formed by the cloth filter media support structure to discharge filtered influent from the treatment basin. Effluent plenum is used in the following specification and claims of this patent in a non-limiting fashion and as a shorthand way to distinguish the effluent discharge formed by the support structure of the present inventions from the effluent chambers, conduits, channels and the like used in relation to and/or are a part of a typical treatment basin or tank.

Where alternative meanings are possible, in either the specification or claims, the broadest meaning is intended. All words used in the claims are intended to be used in the normal, customary usage of grammar and the English language.

BRIEF DESCRIPTION OF THE DRAWINGS

The above described objects, features and advantages, as well as other features and advantages, of the present inventions (sometimes used in the singular, but not excluding the plural) will become apparent by reference to the specification and drawings; wherein like reference numbers are used for like elements among the several views, and in which:

FIG. 10-A is a schematic cross-sectional view of an alternative cross-sectional shape of the cloth filter media support structure.

FIG. 10-B is a schematic cross-sectional view of an alternative embodiment of a cloth filter media support structure of the present invention having a flat cross-section and situated over the floor of a treatment basin.

DETAILED DESCRIPTION OF PREFERRED EMBODIMENTS

Set forth below is a description of what is currently believed to be the preferred embodiments or best representative examples of the inventions claimed. Future and present alternatives and modifications to the preferred embodiments are contemplated. Any alternatives or modifications which make insubstantial changes in function, purpose, structure, use or result are intended to be covered by the claims of this patent.

Figure 1:
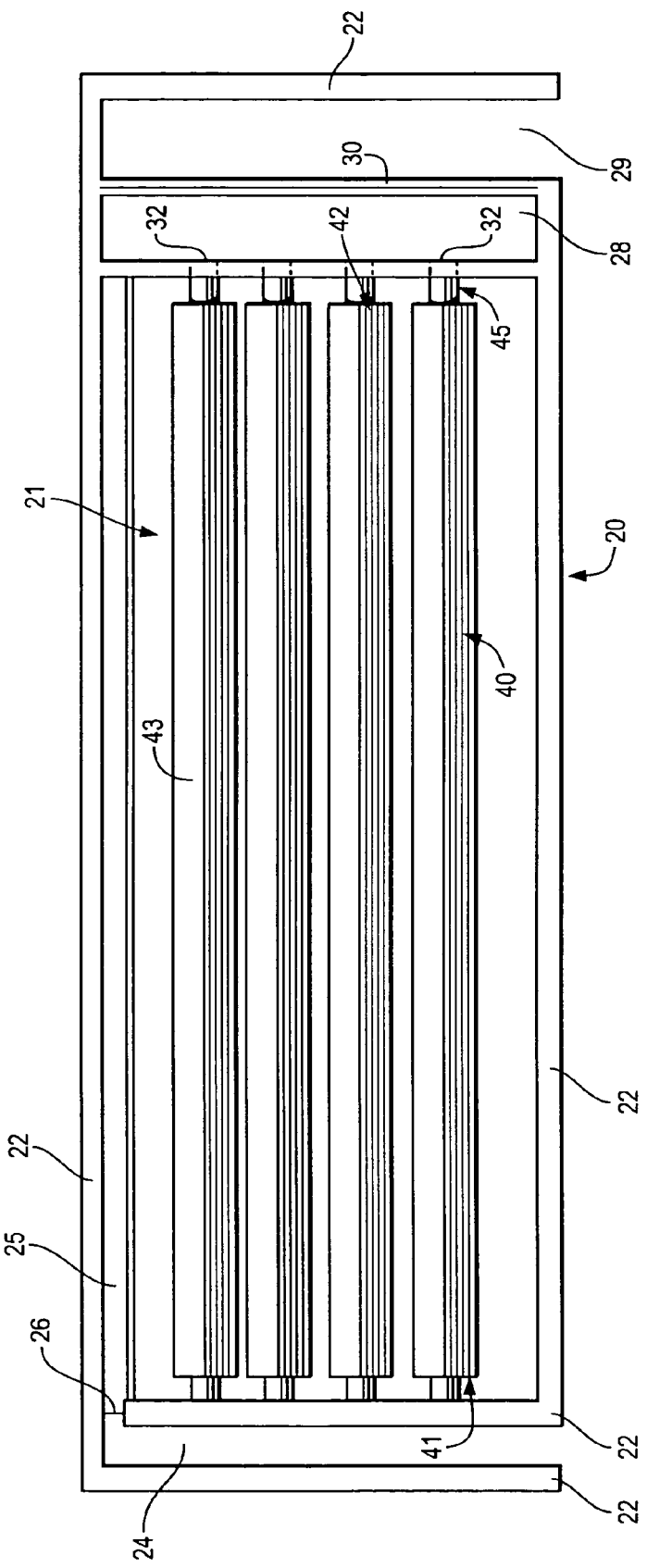
FIG. 1 is a schematic plan view of a series of cloth filter media support structures of the present invention shown situated in a typical water or wastewater treatment basin.
Figure 2:
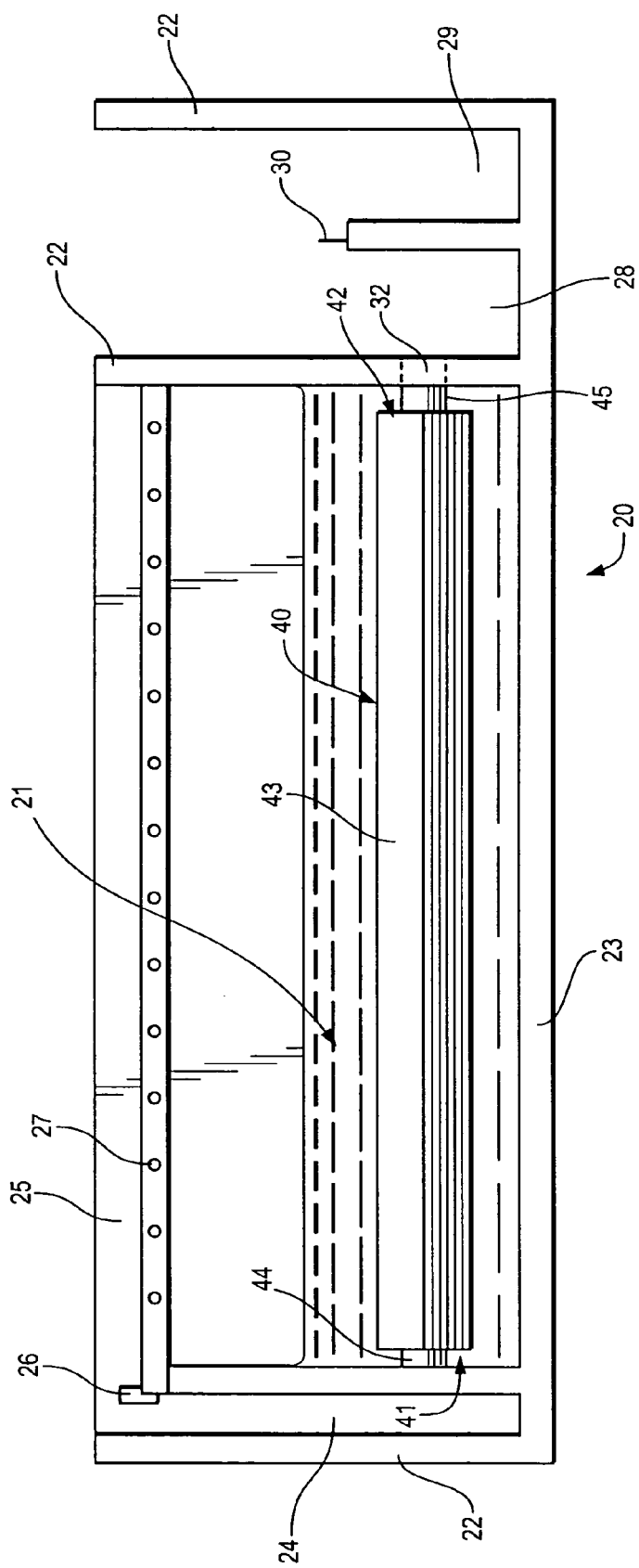
FIG. 2 is a schematic elevational view of the inventions of FIG. 1.
Figure 3:
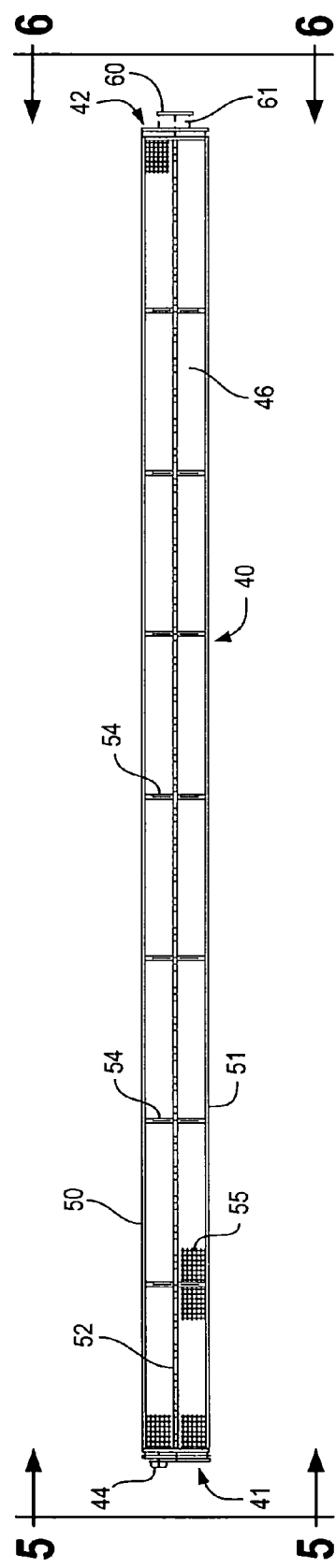
FIG. 3 is an elevational view of a preferred cloth filter media support structure of the present invention.

The system and devices of a typical embodiment of the present invention is shown generally as 20 in FIGS. 1 and 2. The present inventions may be designed to be retrofit into the footprint of an existing filtration basin to replace, for example, a typical granular media gravity filtration system. Modifications of the existing basin, as will be understood by those of ordinary skill in the art, may be required to conform the existing basin to accommodate the present inventions, such as the erection of dividing walls and the like. The present inventions may also be designed for a new installation or installed in a stand alone tank arrangement similar to convention rotating disk filtration. For purposes of clarity, but not as any limitation, the present inventions will be discussed in relation to and/or as part of treatment basin 21, typically constructed from concrete or other suitable materials. The treatment basin 21 typically includes side walls 22 and a floor or bottom 23. A common influent chamber 24 may be provided which is in fluid communication with the influent channel 25 of the treatment basin. An influent weir 26 may also be provided to control the flow of influent water or wastewater to be treated. Influent flows along the influent channel 25 and into treatment basin 21 through holes 27 or other well known means. A typical treatment basin 21 also includes or may be provided with an effluent chamber 28 that is in fluid communication with an effluent channel 29 via an effluent weir 30 or other well known means of flow control.

The present inventions include a cloth filter media support structure 40 which supports cloth filter media 43 and remains stationary during filtering and cleaning as hereinafter described. Cloth filter media support structure 40 has a closed end 41 and an open end 42. It is preferred, but not required, that cloth filter media 43 is formed from a one piece sock, the open end of which terminates and is sealed at the open end 42 of support structure 40. The closed end 41 of support structure 40 is secured to an end wall 22 or bottom 23 of treatment basin 21 by, for example, mounting brackets 44 or other suitable means. The open end 42 of support structure 40 is attached to an opposing wall 22 of treatment basin 21 using pipes, coupling, flanges, brackets or the like as hereinafter described and shown generally as 45 in FIGS. 1 and 2. Open end 42 is in fluid communication with effluent outlet 32, which in turn is in fluid communication with effluent chamber 28.

Support structure 40 supports cloth filter media 43 so that, as hereinafter described, a hollow interior or effluent plenum 46 is formed (not shown in FIGS. 1 and 2) that permits influent to flow through the cloth filter media 43 and into effluent plenum 46 of support structure 40 to be discharged through open end 42 into effluent chamber 28 via effluent outlet 32. In this manner, cloth filter media support structure 40 both supports the cloth filter media 43 and forms an effluent plenum 46. During operation, support structure 40 remains stationary and there are only two non-moving seals necessary in this embodiment at the open end 42 of the support structure 40 to prevent the infiltration of untreated influent into the effluent, as hereinafter described.

A preferred embodiment of a cloth filter media support structure 40 of the present invention may be seen in more detail by reference to FIGS. 3-8. Preferred support structure 40 has a generally diamond shape or any shape with a uniform cross-section as particularly shown in FIGS. 5 and 6. Support structure 40 may be constructed from a longitudinal top frame member 50 and a longitudinal bottom frame member 51 that may be fabricated by one or more pieces of stainless steel, aluminum, plastic or other suitable material. Longitudinal side frame members 52 and 53 may also be provided. A series of side support frame members 54 may be provided and spaced along the length of support structure 40. A cloth support screen 55 is then attached to the sides of the frame members 50, 51, 52 and 53. Support screen 55 supports the cloth filter media 43 and, along with support frame members 50, 51, 52, 53 and 54, forms a hollow interior or effluent plenum 46 through which influent passes, is filtered and discharged. It will be understood by those of skill in the art that support structure 40 may be constructed and assembled in a variety of configurations consistent with the present inventions as disclosed, discussed and/or claimed in this patent. As one alternate example, separate top or bottom frame members 50 and 51 may not be required as sufficient support frame members may be integrated into the sides of the support structure 40. Other methods or means of creating support structure 40 will also be apparent to those of ordinary skill in the art.

Figure 4:
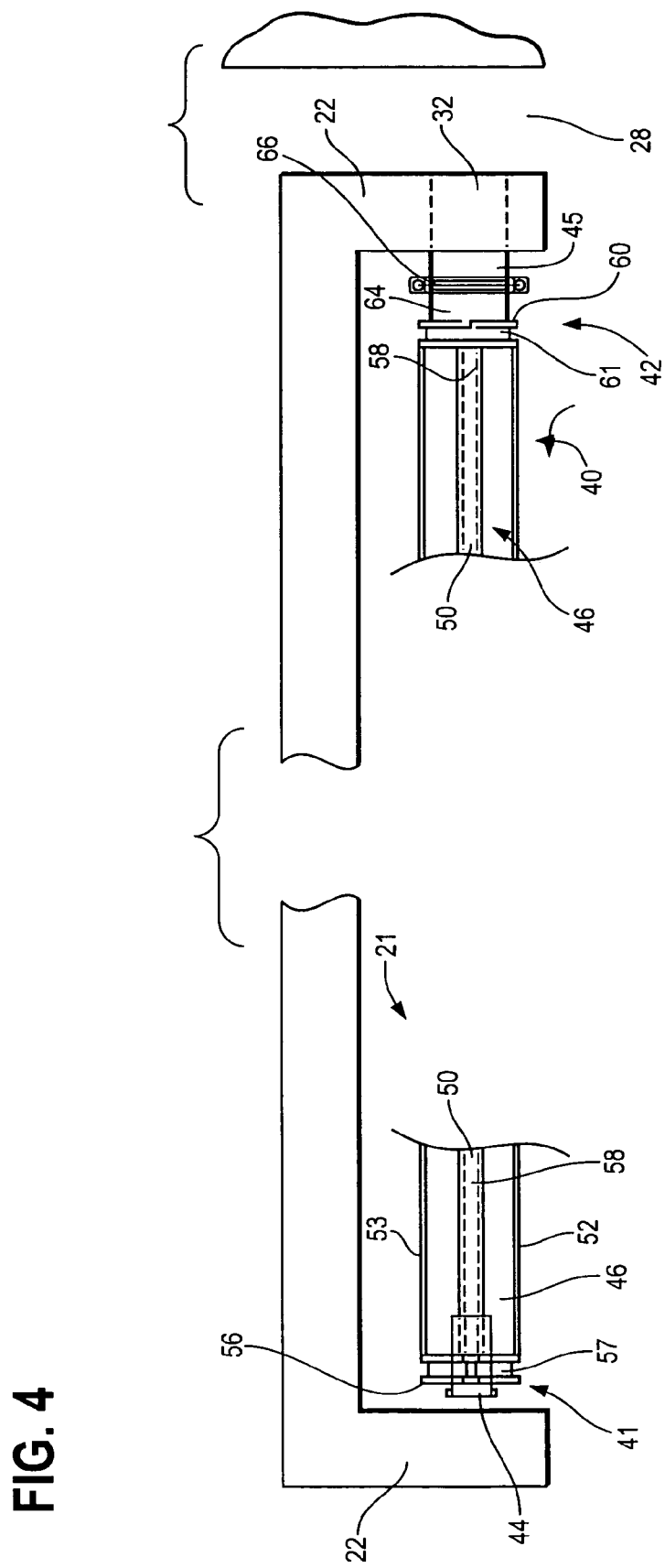
FIG. 4 is a top view of a preferred cloth filter media support structure showing details of each end of the embodiment installed in a typical treatment basin.
Figure 5:
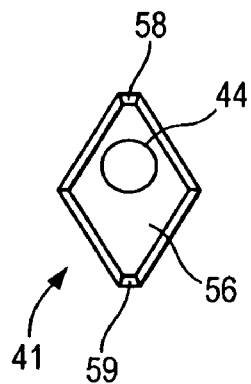
FIG. 5 is an end view of the closed end of the preferred support structure of FIG. 3 taken along line 5-5 of FIG. 3.
Figure 6:
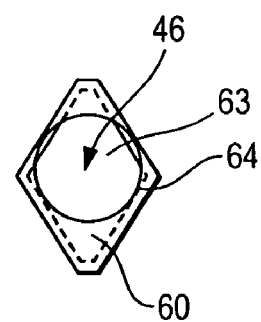
FIG. 6 is an end view of the open end of the preferred support structure of FIG. 3 taken along line 6-6 of FIG. 3.
Figure 7:
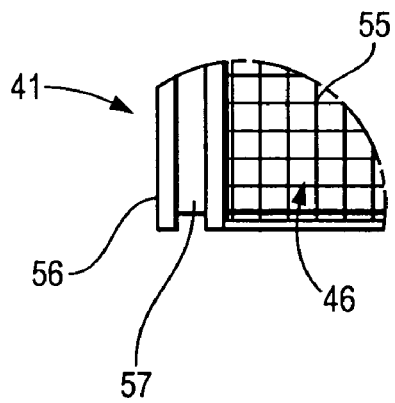
FIG. 7 is an enlarged side view showing additional details of the closed end of the preferred support structure of FIG. 3.
Figure 8:
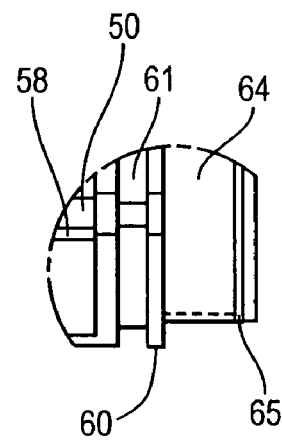
FIG. 8 is an enlarged side view showing additional details of the open end of the preferred support structure of FIG. 3.

An embodiment of closed end 41 of support structure 40 may be seen by reference to FIGS. 4, 5 and 7. A closed end plate 56, that coincides with the cross-sectional shape of support structure 40, is attached to longitudinal frame members 50, 51, 52 and 53 and is impervious to fluid flow. Mounting bracket 44 may be attached to or formed as part of closed end plate 56, although other mounting means may be readily employed. The closed end plate 56 may include channels 57 on the outer sides so that bars or bands (not shown) may be placed in and secured to the channels 57 after cloth filter media 43 is installed in order to help tension, seal and secure the cloth filter media 43 to the support structure 40. Similarly, top and bottom frame members 50 and 51 may also have outwardly facing channels 58 (top channel 58 shown in FIG. 4) into which bars or bands (not shown) may be secured after installation of cloth filter media 43 to help tension and secure the cloth filter media 43 to cloth filter media support structure 40.

An embodiment of open end 42 of support structure 40 may be seen in more detail by reference to FIGS. 3, 4, 6 and 8. An end plate 60 that coincides with the cross-sectional shape of support structure 40 is attached to longitudinal frame members 50, 51, 52 and 53. End plate 60 may also include side channels 61 into which corresponding bars or bands (not shown) may be placed in and secured to after cloth filter media 43 is installed to help tension, seal and secure the cloth filter media 43 to support structure 40. Attached to or formed as part of end plate 60 is an opening 63 which may be in the form of a circular pipe 64 or other well known shapes and means.

The distal end of pipe 64 may include a groove 65. To aid in the attachment of open end 42 to the effluent outlet 32, an effluent pipe 45 may be provided which is in fluid communication with effluent outlet 32 of treatment basin 21. Pipe 45 is typically the same size as circular pipe 64 of open end 42. In a preferred embodiment, circular pipe 64 is attached to pipe 45 through the use of a ring coupling 66 that engages groove 65 and connects distal end 64 to pipe 45 in order to provide a water tight seal. Other methods may include flanges, threads and/or sleeves, as will be understood by those in the art.

In operation of the preferred embodiment of the present invention 20, untreated influent flows into common influent chamber 24 and is introduced into influent channel 25 via influent weir 26. The influent is distributed into treatment basin 21 through holes 27 or other well known means on influent channel 25. Once in the treatment basin 21, the influent flows through and is filtered by cloth filter media 43 that is attached to and/or supported by stationary cloth filter media support structure 40. The filtered influent flows through the effluent plenum 46 formed by support structure 40, through open end 42 and circular pipe 64, into pipe 45, through outlet 32 and into effluent chamber 28 for ultimate discharge.

It has been determined that when the present inventions are retrofit into standard width treatment basins, a series of cloth filter media support structures is preferred. For example, in a standard nine foot wide basin, four support structures 40 may be used; in a twelve and one-half foot basin, six support structures may be used; and, in a sixteen foot basin, eight support structures 40 may be used. However, the number and spacing of support structures 40 is determined based upon flow, capacity and other design considerations, as will be understood by those of skill in the art.

Figure 12:
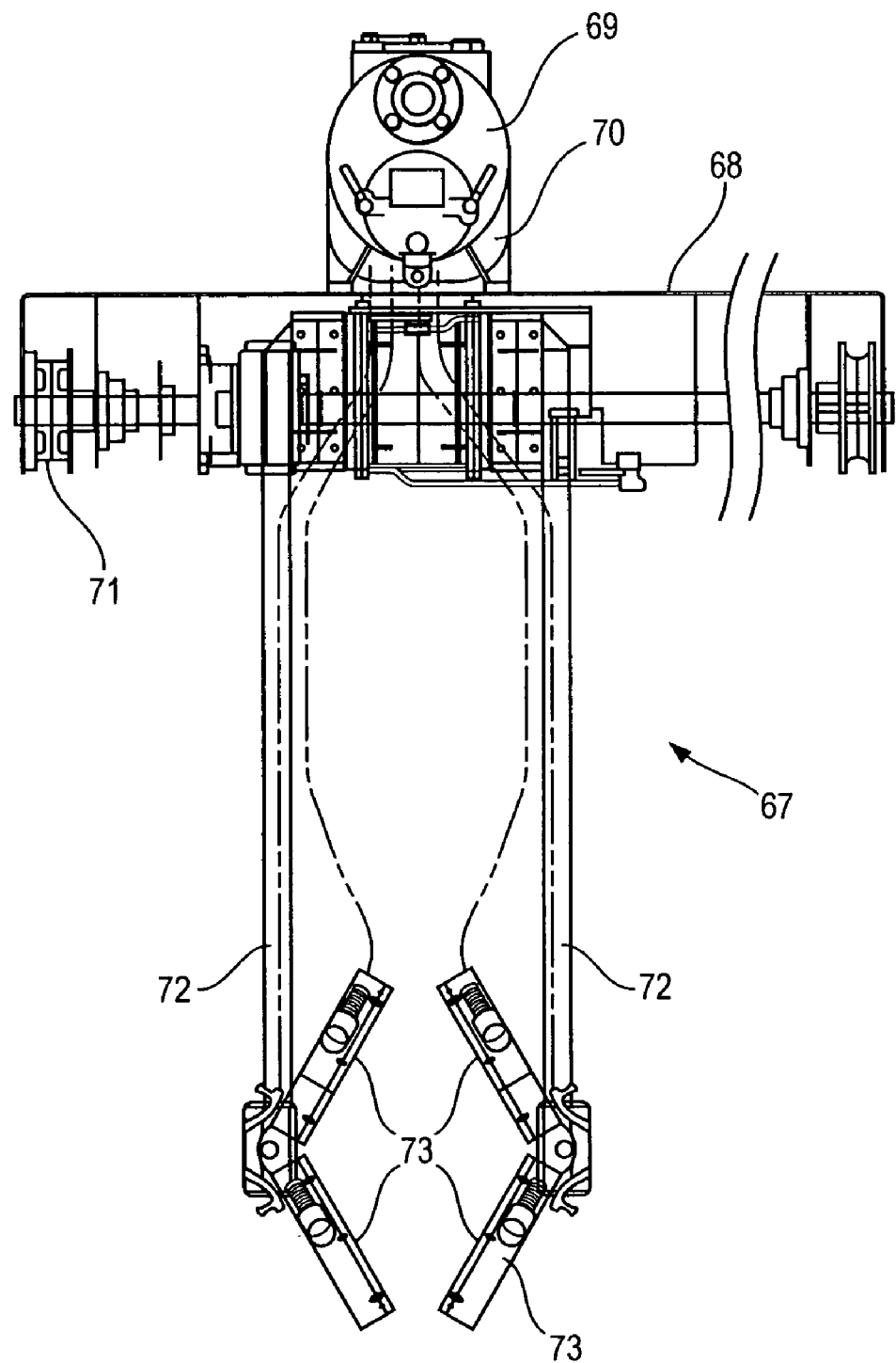
FIG. 12 is an end view of a preferred embodiment of the principal components of a traversing backwash system of the present invention.
Figure 13:
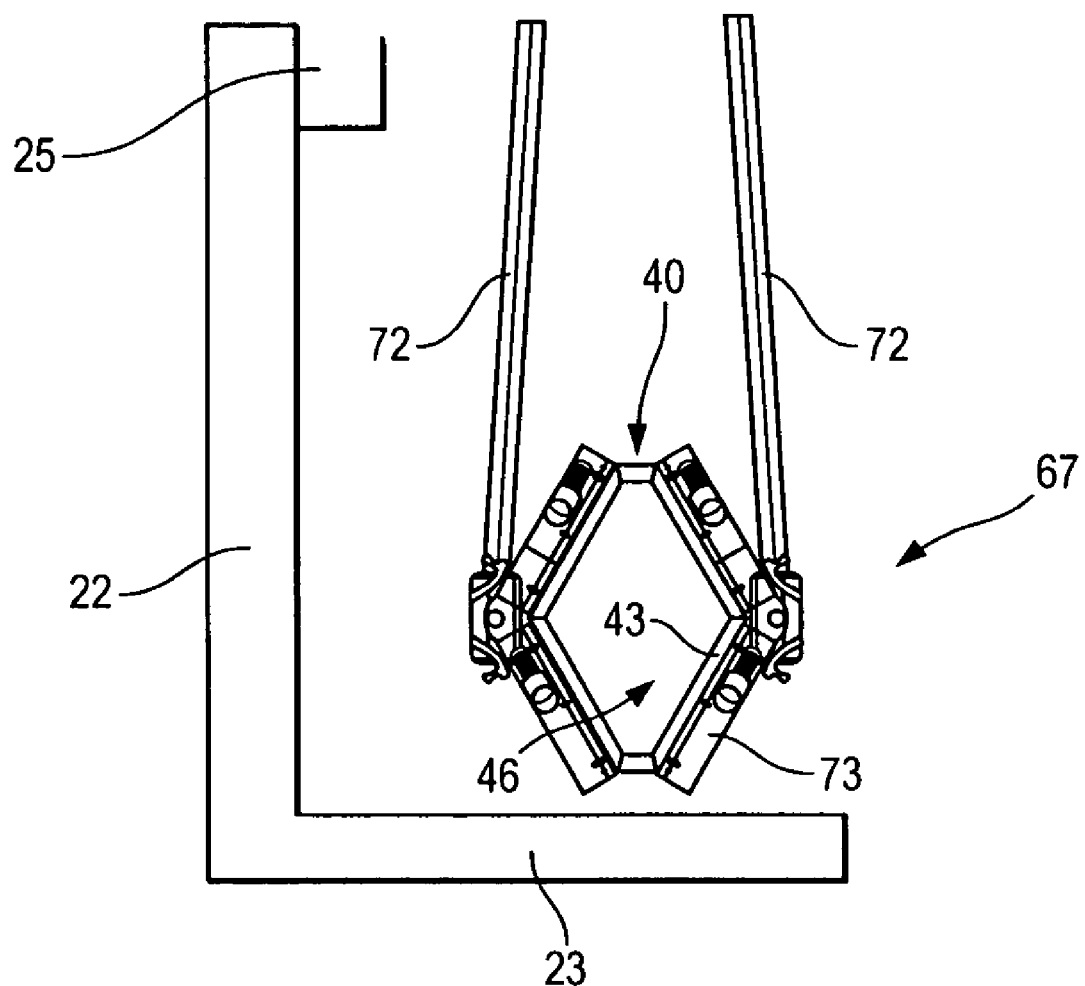
FIG. 13 is an end view of a preferred traversing backwash system of the present invention showing typical backwash shoes engaged with the cloth filter media covered support structure of the present invention.

Periodic cleaning of the cloth filter media 43 may be accomplished by a traversing backwash system shown generally as 67 in FIGS. 12 and 13. A preferred embodiment of the traversing backwash system 67 may be similar to a typical traveling bridge type assembly that includes the bridge structure 68 that supports motors 69, pumps 70 and wheels 71 that enable movement of the system 67 along the axis of the plenum 46 and over the cloth filter media 43. Support arms 72 are also provided and supported by bridge structure 68. Support arms 72 carry backwash shoes 73 that are used to clean the cloth filter media 43. Although not discussed in detail herein, hoses, wires and other necessary electrical, mechanical and structural components are provided to enable the backwash operation via backwash shoes 73, as will be understood by those of skill in the art.

In a preferred embodiment, backwash shoes 73 are spring biased to properly engage support structure 40 as shown in FIG. 13. The number, spacing and configuration of the backwash shoes depends upon the cross-sectional shape of the cloth filter media support structure 40. When backwashing is desired, bridge structure 68 rides along the top of treatment basin 21 and along the axis of the support structure 40. The backwash system 67 may also run mid-depth or under support structure 40, depending upon the particular embodiment. Suction applied to backwash shoes 73 clean filter media 43 as the assembly 67 traverses the length of the basin and the length of stationary cloth filter media support structure 40. As will be understood by those of skill in the art, a control system is typically provided to regulate the backwash, filtering and other operations.

Figure 9:
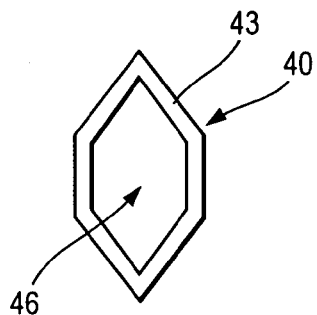
FIG. 9 is a schematic sectional view of an alternative cross-sectional shape of the cloth filter media support structure.
Figure 10:
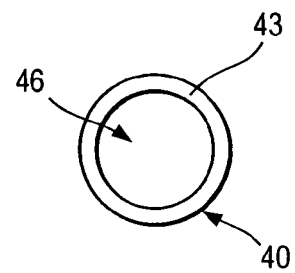
FIG. 10 is a schematic cross-sectional view of an alternative cross-sectional shape of the cloth filter media support structure.
Figure 10A:
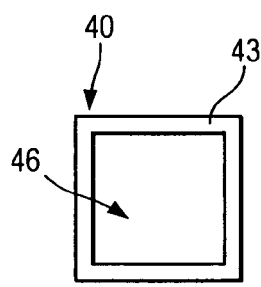
Figure 10B:
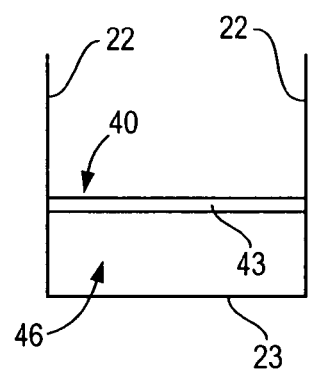
Figure 11:
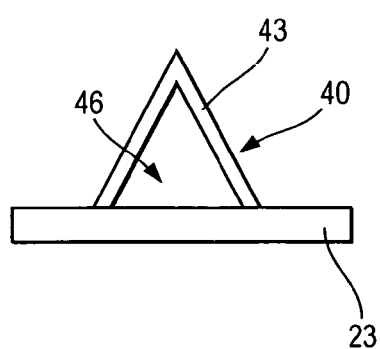
FIG. 11 is a schematic view of an alternative cross-sectional shape of the cloth media support structure, the support structure shown adjacent to the floor of a treatment basin.

Other specified and unspecified embodiments may also be used to practice the present inventions. For example, different cross-sectional shapes of support structure 40 may be readily employed, including but not limited to, the hexagonal, circular and square cross-sectional shapes shown in FIGS. 9, 10 and 10-A. In addition, as shown in FIG. 11, the support structure 40 may be placed on and/or secured to the bottom 23 of the treatment basin, potentially using floor 23 to form part of effluent plenum 46, and may also have a variety of cross-sectional shapes. Similarly, as shown in FIG. 10-B, support structure 40 may be flat and create an effluent plenum 46 incorporating the sides 22 and bottom 23 of treatment basin 21. In addition, alternative traversing backwash systems are also contemplated. For example, backwash shoes 73 (and their related components for performing backwashing operation) may be submerged in treatment basin 21 and pushed or pulled along support structure 40 by cables, pulley and the like (not shown). And, although a one piece sock cloth filter media 43 is preferred, separate sections and/or pieces may also be used.

The above description is not intended to limit the meaning of the words used in the following claims that define the invention. Rather, it is contemplated that future modifications in structure, function or result will exist that are not substantial changes and that all such insubstantial changes in what is claimed are intended to be covered by the claims. Thus, while preferred embodiments of the present inventions have been illustrated and described, it will be understood that changes and modifications can be made without departing from the claimed invention. In addition, although the term "claimed invention" or "present invention" is sometimes used herein in the singular, it will be understood that there are a plurality of inventions as described and claimed.

Various features of the present inventions are set forth in the following claims.

What is claimed is:

1. A method for filtering an influent of water or wastewater in a filtration area of a treatment basin, the filtration area having opposing side walls and a floor and discharging a filtered influent, including the steps of:

introducing water or wastewater for filtering into the filtration area of the treatment basin above a plurality of stationary cloth media support structures;

filtering the influent by gravity such that the influent flows through a plurality of cloth filter media separately attached to each of said plurality of stationary cloth media support structures, each having a length and two ends, a longitudinal axis along said length, a cross-sectional shape and at least one of said ends having an opening, said opening being perpendicular to said longitudinal axis of said length and said opening in fluid communication with an outlet of the treatment area of the treatment basin through a side wall of the filtration area, and each of said ends of said support structure is mounted to and supported by said opposing side walls of said filtration area of the treatment basin;

discharging the filtered influent through an effluent plenum defined as a substantially hollow interior which is formed by each said stationary cloth media, support structure and said cloth filter media separately associated with each support structure;

periodically cleaning said cloth filter media by backwashing with a linearly moving backwash assembly; and a control system to selectively control said steps.

2. The method of claim 1 wherein said cloth filter media is a one piece sock.

3. A method for filtering an influent of water or wastewater in a treatment basin having side walls and a floor and discharging a filtered influent, including the steps of:

introducing water or wastewater for filtering into a treatment basin;

filtering the influent by gravity such that the influent flows through a plurality of cloth filter media separately attached to a plurality of substantially hollow stationary cloth media support structures, each having a length, a cross-sectional shape and two ends, at least on end of said length having an opening, said at least one end having an opening being attached to and supported by a side wall of the treatment basin and said opening having an opening plane which is generally parallel to said side walls of said treatment basin, said opening is in fluid communication with an outlet of the treatment basin, and the other end of the length of each said cloth media support structure is attached to and supported by an opposing side wall of the treatment basin; and each cloth media support structure suspended substantially entirely above the floor of the treatment basin and extends substantially entirely between opposing side walls of the treatment basin;

discharging the filtered influent through an effluent plenum defined as a substantially hollow interior which is formed in each said stationary cloth media support structure and said cloth filter media separately associated with each support structure; and periodically cleaning said cloth fiber media using a backwash shoe and suction.

4. The method of claim 3 wherein the support structure has a hexagonal cross-sectional shape.

5. The method of claim 3 wherein the support structure has a circular cross-sectional shape.

6. The method of claim 3 wherein the support structure has is triangular cross-sectional shape.

7. The method of claim 3 wherein the support stricture has a square cross-sectional shape.

8. The method of claim 3 wherein the support structure has a diamond cross-sectional shape.

9. A method for filtering an influent of water or wastewater in a filtration area of a treatment basin, the filtration area having stationary side wails and a floor and discharging a filtered influent, including the steps of:

introducing or wastewater for filtering into the filtration area of the treatment basin above a plurality of cloth media support structures;

filtering the influent by gravity such that the influent flows through a plurality of cloth filter media separately attached to each of said plurality of substantially hollow stationary cloth media support structures, each having a length, a longitudinal axis along said length, a cross-sectional shape and two ends, at least one end having an opening, said at least one end having an opening being mounted to and supported by a side wall of said treatment basin, and the other end mounted to and supported by an opposing side wall of the treatment basin, said opening being perpendicular to said longitudinal axis at said length and said opening is in fluid communication with an outlet of the filtration area of the treatment basin and each cloth media support structure suspended substantially entirely above the floor of the area of the treatment basin, wherein each cloth media support structure extends substantially entirely between opposing side walls of the treatment basin;

discharging the filtered influent through an effluent plenum defined as a substantially hollow interior which is formed by each said stationary cloth media support structure and said cloth filter media separately associated with each support structure; and periodically cleaning said cloth filter media using a linearly moving backwash assembly baying a backwash shoe and suction.

10. A method for filtering an influent of water or wastewater in a filtration area of a treatment basin, the filtration area having stationary side walls and a floor and discharging as filtered influent, including the steps of:

introducing water or wastewater for filtering into the filtration area of the treatment basin above a bottom portion of a substantially hollow, stationary cloth media support structure having two ends, one end being an open end in fluid communication with an outlet of the filtration area;

filtering the influent by gravity such that said influent flows through cloth filter media attached to said cloth media support structure forming an effluent plenum defined as a hollow interior substantially surrounded on all sides by said cloth filter media and which extends between the opposing site walls of the filtration area of the treatment basin, and which is suspended substantially entirely above the floor of the treatment area of the treatment basin and each end of which is mounted to and supported by opposing side walls of said filtration area;

discharging the filtered influent from said effluent plenum to the exterior of the t filtration area through the outlet, wherein said outlet, said cloth media support structure and said effluent plenum are not in contact with the floor of the filtration area of the treatment basin; and periodically cleaning said cloth filter media using a backwash shoe and suction.

11. The method of claim 10 including a plurality of cloth media support structures.

12. A method for filtering an influent of water or wastewater in a treatment basin having opposing and stationary side walls and discharging a filtered influent, including the steps of:

introducing water or wastewater for filtering into a treatment basin;

filtering the influent by gravity such that the influent flows through a plurality of cloth filter media separately at attached to a plurality of substantially hollow stationary cloth media support structures, each having a length, a longitudinal axis along said length, a cross-sectional shape and two opposing ends, at least one end having an opening, said opening being perpendicular to said longitudinal axis of said length and said opening in fluid communication with an outlet of the treatment basin and where each said support structure extends between opposing side walls of the treatment basin such that opposing ends of the length of each support structure are attached to and are supported by the opposing side walls of the treatment basin;

discharging the filtered influent through an effluent plenum defined as a substantially hollow interior which is formed by each said stationary cloth media support structure and the cloth filter media separately associated with each support structure; and periodically cleaning said cloth filter media using a backwash shoe and suction.

13. A method for filtering, an influent of water or wastewater in a treatment basin having side walk and a floor and discharging a filtered influent, including the steps of:

introducing water or wastewater for filtering into a treatment basin;

filtering the influent by gravity such that the influent flows through a plurality of cloth filter media separately attached to a plurality of stationary cloth media support structures, each stationary cloth media support structure having a length, a cross-sectional shape and two ends, one end of said length having an opening, said opening having an opening plane which is generally parallel to said side walls of said treatment basin, said opening in fluid communication with an outlet of the treatment basin, and each cloth media support structure is suspended substantially above the floor of the treatment basin and extends substantially entirely between opposing side walls of the treatment basin such that each of said two ends of said support structure is attached to and supported by opposing side walls of the treatment basin;

discharging the filtered influent through an effluent, plenum, said effluent plenum formed by the substantially hollow interior of the stationary cloth media, support structure and the associated cloth filter media and extending from a closed end of said effluent plenum to said open end and on to an effluent chamber; and periodically cleaning said cloth filter media using a backwash shoe and suction.

14. The method of claim 13 wherein the cross-sectional shape of the cloth media support structure is a hexagon.

15. The method of claim 13 wherein the cross-sectional shape of the cloth media support structure is a circle.

16. The method of claim 13 wherein the cross-sectional shape of the cloth media support structure is a triangle.

17. The method of claim 13 wherein the cross sectional shape of the cloth media support structure is a square.

18. The method of claim 13 wherein said cloth filter media is a one piece sock.

19. The method of claim 13 wherein the cross-sectional shape of the support structure is a diamond.

20. The method of claim 13 wherein said filtration and cleaning operations are controlled with a control system.

21. The method of claim 13 wherein the cross-sectional shape of the support structure is a rectangle.

22. A method for filtering an influent of water or wastewater by gravity in a treatment basin having stationary opposing side walls, including the steps of:

introducing said influent into said treatment basin;

filtering said influent through a cloth filter media, said cloth filter media supported by a stationary and substantially hollow cloth filter media support structure, said cloth media support structure having a length and two ends, one end being an open end mounted to and supported by a side wall of said basin and in fluid communication with an outlet of said basin on a side wall of said basin, and the other end of said cloth filter media support structure supported by and attached to an opposing side wall of said basin, wherein the length of said cloth filter media support structure extends between opposing side walls of said basin and said cloth filter media support structure is fixed within said treatment basin;

discharging the filtered influent from said basin; and, periodically cleaning said cloth filter media using a linearly moving, traversing backwash system including backwash shoes extending to said cloth filter media to clean said cloth filter media using suction.

* * * * *

UNITED STATES PATENT AND TRADEMARK OFFICE
CERTIFICATE OF CORRECTION

| | | |
|---|---|---|
| PATENT NO. | : 8,329,045 B2 | Page 1 of 1 |
| APPLICATION NO. | : 10/455748 | |
| DATED | : December 11, 2012 | |
| INVENTOR(S) | : Baumann et al. | |

It is certified that error appears in the above-identified patent and that said Letters Patent is hereby corrected as shown below:

In Claim 6, Col. 9, lines 32-33, "has is" should read --has a--

In Claim 7, Col. 9, line 34, "stricture" should read --structure--

Signed and Sealed this
Fifth Day of February, 2013

Teresa Stanek Rea
*Acting Director of the United States Patent and Trademark Office*